United States Patent
Tang

(10) Patent No.: US 11,889,474 B2
(45) Date of Patent: *Jan. 30, 2024

(54) METHOD FOR CARRIER SELECTION IN VEHICLE TO EVERYTHING SYSTEM AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 41 days.

This patent is subject to a terminal disclaimer.

(21) Appl. No.: 17/332,832

(22) Filed: May 27, 2021

(65) Prior Publication Data

US 2021/0289478 A1   Sep. 16, 2021

Related U.S. Application Data

(63) Continuation of application No. 17/020,816, filed on Sep. 15, 2020, now Pat. No. 11,044,703, which is a
(Continued)

(51) Int. Cl.
*H04W 72/02* (2009.01)
*H04W 4/40* (2018.01)
(Continued)

(52) U.S. Cl.
CPC .............. *H04W 72/02* (2013.01); *H04W 4/40* (2018.02); *H04W 72/0453* (2013.01); *H04W 74/0808* (2013.01); *H04W 92/18* (2013.01)

(58) Field of Classification Search
CPC ......... H04B 7/024; H04L 1/0001; H04L 5/00; H04W 4/40–48; H04W 16/00;
(Continued)

(56) References Cited

U.S. PATENT DOCUMENTS

| 7,515,913 | B2 | 4/2009 | Hiddink et al. |
| 8,483,612 | B2 | 7/2013 | Yamamoto et al. |

(Continued)

FOREIGN PATENT DOCUMENTS

| CN | 104813728 A | 7/2015 |
| CN | 105916182 A | 8/2016 |

(Continued)

OTHER PUBLICATIONS

The first Office Action of corresponding Canada application No. 3093965, dated Sep. 27, 2021.
(Continued)

*Primary Examiner* — Thomas R Cairns
(74) *Attorney, Agent, or Firm* — Ladas & Parry, LLP

(57) ABSTRACT

Embodiments of the present disclosure provide a method for carrier selection in a vehicle to everything (V2X) system and a terminal device, including: determining, by a terminal device according to at least one of information of data to be transmitted, information of the terminal device or information of a carrier for current use, whether to perform carrier selection.

17 Claims, 2 Drawing Sheets

Related U.S. Application Data continuation of application No. PCT/CN2018/079205, filed on Mar. 15, 2018.

(51) Int. Cl.
*H04W 72/0453* (2023.01)
*H04W 74/08* (2009.01)
*H04W 92/18* (2009.01)

(58) Field of Classification Search
CPC ............ H04W 28/12; H04W 36/06; H04W 36/36–365; H04W 72/02; H04W 72/0453; H04W 72/0808; H04W 72/12; H04W 72/1242; H04W 72/14; H04W 92/18; H04W 4/463; H04W 72/23–232; H04W 72/569; H04W 74/0808–0825; H04W 36/362; H04W 72/40

See application file for complete search history.

(56) References Cited

U.S. PATENT DOCUMENTS

| | | | |
|---|---|---|---|
| 10,542,399 | B2 | 1/2020 | Kim et al. |
| 2008/0200121 | A1 | 8/2008 | Yamamoto |
| 2015/0172956 | A1 | 6/2015 | Noh et al. |
| 2017/0188391 | A1 | 6/2017 | Rajagopal et al. |
| 2018/0049084 | A1 | 2/2018 | Lee et al. |
| 2018/0049220 | A1 | 2/2018 | Patil et al. |
| 2018/0167912 | A1 | 6/2018 | Cao et al. |
| 2019/0116475 | A1 | 4/2019 | Lee et al. |
| 2019/0166534 | A1* | 5/2019 | Williammee ......... H04W 36/14 |
| 2019/0289615 | A1 | 9/2019 | Lee et al. |
| 2019/0357025 | A1 | 11/2019 | Hwang et al. |
| 2020/0029245 | A1 | 1/2020 | Khoryaev et al. |

FOREIGN PATENT DOCUMENTS

| | | |
|---|---|---|
| CN | 106376082 A | 2/2017 |
| CN | 106413096 A | 2/2017 |
| CN | 106464463 A | 2/2017 |
| CN | 106488560 A | 3/2017 |
| EP | 3761728 A1 | 1/2021 |
| KR | 20080053163 A | 6/2008 |
| KR | 20100133895 A | 12/2010 |
| WO | 2018128372 A1 | 7/2008 |
| WO | 2015178851 A1 | 11/2015 |
| WO | 2017121618 A2 | 7/2017 |
| WO | 2017150957 A1 | 9/2017 |
| WO | 2019174017 A1 | 9/2019 |

OTHER PUBLICATIONS

The first Office Action of corresponding Japanese application No. 2020-549593, dated Feb. 1, 2022.
Ericsson,Sidelink Carrier Selection Criteria for TX[online],3GPP TSG RAN WG2 #100 R2 / 1713516,Internet<URL:http://www.3gpp.org/ftp/tsg_ran/WG2_RL2/TSGR2_100/Docs/R2-1713516.zip>, 2017 Nov. 17, 2015, entire document (cited in first Office Action of corresponding Japanese application No. 2020-549593, dated Feb. 1, 2022, and has relevance at least as described therein).
3rd Generation Partnership Project, Technical Specification Group Radio Access Network; Evolved Universal Terrestrial Radio Access (E-UTRA);Medium Access Control (MAC) protocol specification (Release 14),3GPP TS 36.321 V14.5.0 (Dec. 2017), Jan. 7, 2018, (cited in first Office Action of corresponding Japanese application No. 2020-549593, dated Feb. 1, 2022, and has relevance at least as described therein).
The first Office Action of corresponding Indian application No. 202017042018, dated Mar. 7, 2022.
The Notice of Allowance of corresponding Chinese application No. 201880037517.4, dated May 28, 2021.
Huawei, HiSilicon, 3GPP TSG-RAN WG2 Meeting #101 R2-1801912; On the sublayers and triggers for Tx carrier selection, published Mar. 2, 2018.
International Search Report(ISR) dated Dec. 19, 2018 for Application No. PCT/CN2018/079205.
The First Office Action of corresponding Chinese application No. 201880037517.4, dated Apr. 28, 2020.
The Second Office Action of corresponding Chinese application No. 201880037517.4, dated Jul. 31, 2020.
R1-1721139—WF on carrier selection rule and resource selection procedure for mode 4 CA; Nov. 27-Dec. 1, 2017, entire document.
R1-1801301—Final_Minutes_report_RAN1#91_v100;All pages; Feb. 26-Mar. 2, 2018, entire document.
R2-1801852—Carrier selection in CA-based eV2x;1-4pages; Feb. 26-Mar. 2, 2018, entire document.
R2-1802695—Summary of e-mail discussion 100#41 Tx carrier selection; Feb. 26-Mar. 2, 2018, entire document.
R2-1802920—Consideration of carrier reselection; Feb. 26-Mar. 2, 2018, entire document.
The Notice of Rejection of corresponding Chinese application No. 201880037517.4, dated Dec. 2, 2020.
The EESR of corresponding European application No. 18909360.2 dated Dec. 21, 2020.
OPPO: "Carrier selection in CA-based eV2X", 3GPP Draft; R2-1712178—Carrier Selection in CA-Based eV2X 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017 Nov. 17, 2017(Nov. 17, 2017), XP051371336, entire document.
ZTE: "Discussion on carrier selection in PC5 CA", 3GPP Draft; R2-1713070, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017 Nov. 17, 2017(Nov. 17, 2017), XP051371898, entire document.
Ericsson; "Sidelink Carrier Selection Criteria", 3GPP Draft; R2-1711493—Sidelink Carrier Selection Criteria, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017 Sep. 28, 2017(Sep. 28, 2017), XP051354653, entire document.
The Non-final rejection corresponding U.S. Appl. No. 17/020,816, dated Nov. 12, 2020.
The Notice of Allowance of corresponding American U.S. Appl. No. 17/020,816, dated Feb. 24, 2021.
Written Opinion dated Dec. 19, 2018 for Application No. PCT/CN2018/079205.
International Preliminary Report on Patentability dated Sep. 15, 2020 for Application No. PCT/CN2018/079205.
The first Office Action of corresponding Korean application No. 10-2020-7027381, dated Dec. 16, 2022.
The EESR of corresponding European application No. 22187684.0, dated Oct. 14, 2022.
Ericsson, "Distributed Resource Allocation for V2X over PC5", R1-161070, 3GPP TSG RAN WG1 Meeting #84, Malta, Feb. 15-19, 2016, all pages.
Intel Corporation, "Discussion on Resource Reselection Triggers for V2V Communication," R1-164138, 3GPP TSG RAN WG1 Meeting #85, Nanjing, China, May 23-27, 2016, all pages.
ZTE, "Details of resource selection using partial sensing by P-UEs," R1-1609806, 3GPP TSG RAN WG1 Meeting #86bis, Lisbon, Portugal Oct. 10-14, 2016, all pages.
Qualcomm Incorporated, "Sensing based resource selection for V2P," R1-1611592, 3GPP TSG-RAN WG1 #87, Reno, Nevada, USA, Nov. 14-18, 2016, all pages.
Huawei, HiSilicon, "On carrier selection for multi-carrier operation," R2-1701367, 3GPP TSG RAN WG2 Meeting #97, Athens, Greece, Feb. 13-17, 2017, all pages.
The Notice of Allowance of corresponding Korean application No. 10-2020-7027381, dated Jun. 30, 2023.
The first Office Action of corresponding Australian application No. 2018412968, dated Aug, 28, 2023.

(56) References Cited

OTHER PUBLICATIONS

The first Office Action of corresponding Mexican application No. MX/a/2020/009630, dated Oct. 25, 2023.

* cited by examiner

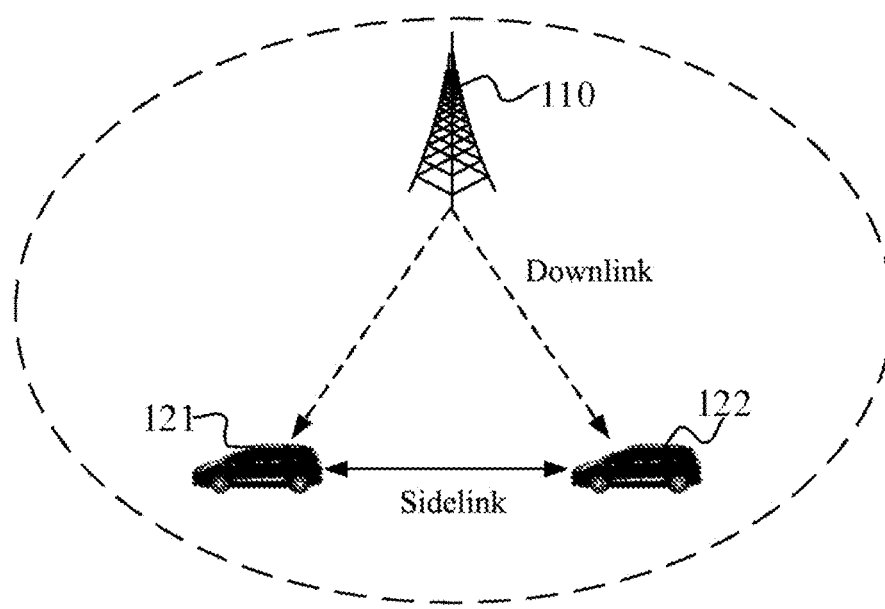
FIG. 1
200
Determining, by a terminal device according to at least one of information of data to be transmitted, information of the terminal device or information of a carrier for current use, whether to perform carrier selection — S210
FIG. 2
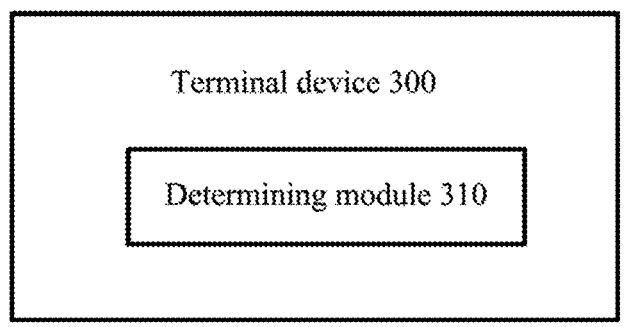
FIG. 3

METHOD FOR CARRIER SELECTION IN VEHICLE TO EVERYTHING SYSTEM AND TERMINAL DEVICE

CROSS-REFERENCE TO RELATED APPLICATIONS

This application is a continuation of U.S. patent application Ser. No. 17/020,816, filed on Sep. 15, 2020, which is a continuation of International Application No. PCT/CN2018/079205, filed on Mar. 15, 2018. The aforementioned patent applications are hereby incorporated by reference in their entireties.

TECHNICAL FIELD

The present disclosure relates to the field of communication technologies and, in particular, to a method for carrier selection in a vehicle to everything system (V2X) and a terminal device.

BACKGROUND

A vehicle to everything system is a sidelink (SL) transmission technology based on long term evaluation vehicle to vehicle (LTE V2V). Differing from the traditional LTE system where communication data is received or transmitted via a base station, the vehicle to everything system adopts a scheme of terminal-to-terminal direct communication, and therefore obtaining a higher frequency spectrum efficiency and a lower transmission delay.

The vehicle to everything (V2X) technology is standardized in version 14 (Rel-14) of the 3rd Generation Partnership Project (3GPP), where two transmission modes are defined: mode 3 and mode 4. Specifically, in mode 3, a transmission resource for vehicle user equipment is allocated by a base station, and the vehicle user equipment transmits data on a sidelink according to the resource allocated by the base station; the base station may allocate a resource for a single transmission for the terminal, or may allocate a resource for a semi-static transmission for the terminal. In mode 4, vehicle user equipment adopts a transmission scheme of sensing and reservation. Specifically, the vehicle user equipment obtains a set of available transmission resources in a resource pool by way of sensing, and selects a resource randomly from the set for data communication.

Currently, the discussion is focused on supporting multi-carrier transmission in the vehicle to everything system, namely, a terminal device may concurrently select one or a plurality of carriers from multiple carriers for data transmission. In such case, with respect to a terminal device, how to trigger the terminal device to perform carrier selection is a problem need to be solved urgently.

SUMMARY

A method for carrier selection in a vehicle to everything system and a terminal device are provided, which can accomplish carrier selection for a terminal device.

A first aspect provides a method for carrier selection in a vehicle to everything system, including: determining, by a terminal device according to at least one of information of data to be transmitted, information of the terminal device or information of a carrier for current use, whether to perform carrier selection.

Therefore, in the embodiments of the present disclosure, a terminal device may take at least one of the information of the data to be transmitted, the information of the terminal device or the information of the carrier for current use, as reference information for determining whether to trigger the terminal device to perform carrier selection, which is advantageous for satisfying a transmission requirement of the data to be transmitted, additionally, performing carrier selection according to information of the terminal device is advantageous for improving a flexibility of resource configuration.

In an implementation, the terminal device may determine, according to the service type of the data to be transmitted, whether to trigger the terminal device to perform carrier selection. For example, if the service type of the data to be transmitted is a specific service type, the terminal device may determine to perform carrier selection, otherwise, not to perform carrier selection; or, the terminal device may determine, according to the service type of the data to be transmitted and a service type of a service transmitted (i.e. a service already transmitted before a service to be transmitted), whether to perform carrier selection. For example, if the service type of the data to be transmitted and the service type of the service transmitted are different, the terminal device may determine to perform carrier selection, otherwise, determine not to perform carrier selection.

In an implementation, the terminal device may also determine, according to the priority information of the data to be transmitted, whether to perform carrier selection. For example, if a priority of the data to be transmitted is higher than a specific priority, the terminal device may determine to perform carrier selection, otherwise, determine not to perform carrier selection, where the specific priority may be pre-configured, or configured by a network device.

In an implementation, the terminal device may also determine, according to the reliability requirement information of the data to be transmitted, whether to perform carrier selection. For example, if a reliability requirement of the data to be transmitted is greater than a specific reliability threshold (for example, 90%), it is determined to perform carrier selection, where the specific reliability threshold may be pre-configured, or may also be configured by the network device.

In an implementation, the terminal device may also determine, according to the latency information of the data to be transmitted, whether to perform carrier selection. For example, if a latency requirement of the data to be transmitted is smaller than a specific latency threshold (for example, 10 ms), it is determined to perform carrier selection, where the specific latency threshold may be pre-configured, or may also be configured by the network device, which is not limited in the embodiments of the present disclosure.

In an implementation, the terminal device may also determine, according to the information of the terminal version supported by the data to be transmitted, whether to perform carrier selection. For example, if the terminal version supported by the data to be transmitted is a specific version, the terminal device may determine to perform carrier selection, where the specific version may be pre-configured, or configured by the network device.

In a possible implementation manner, the determining, by a terminal device according to at least one of information of data to be transmitted, information of the terminal device or information of a carrier for current use, whether to perform carrier selection, includes:
  determining, by the terminal device, an available carrier for the data to be transmitted according to the information of the data to be transmitted and a first corresponding relationship; and determining, by the terminal device according to the available carrier for the data to be transmitted and the carrier for current use, whether to perform carrier selection.

In a possible implementation manner, the determining, by the terminal device according to the available carrier for the data to be transmitted and the carrier for current use, whether to perform carrier selection, includes:

determining, by the terminal device, to perform carrier selection, if the available carrier for the data to be transmitted and the carrier for current use are different.

In a possible implementation manner, the determining, by the terminal device according to the available carrier for the data to be transmitted and the carrier for current use, whether to perform carrier selection, includes:

determining, by the terminal device, to perform carrier selection, if the available carrier for the data to be transmitted and the carrier for current use are the same, and a reserved resource or a granted resource on the carrier for current use cannot carry the data to be transmitted.

In a possible implementation manner, the first corresponding relationship is a corresponding relationship between at least one of a service type of the data to be transmitted, priority information of the data to be transmitted, reliability requirement information of the data to be transmitted, latency information of the data to be transmitted or information of a terminal version supported by the data to be transmitted, and an available carrier.

In a possible implementation manner, the information of the data to be transmitted includes at least one of the following:

a service type of the data to be transmitted, priority information of the data to be transmitted, reliability requirement information of the data to be transmitted, latency information of the data to be transmitted or information of a terminal version supported by the data to be transmitted.

In a possible implementation manner, the information of the terminal device includes a transmission parameter of the terminal device, the determining, by a terminal device according to at least one of information of data to be transmitted, information of the terminal device or information of a carrier for current use, whether to perform carrier selection, includes:

determining, by the terminal device according to the transmission parameter of the terminal device, whether to perform carrier selection.

In an implementation, the transmission parameter of the terminal device may include at least one of the following: a modulation and coding scheme (MCS), an available physical resource block (PRB), the number of subchannels, the number of retransmissions, or a maximum transmission power.

In a possible implementation manner, the determining, by the terminal device according to the transmission parameter of the terminal device, whether to perform carrier selection, includes:

determining, by the terminal device, to perform carrier selection, if the transmission parameter of the terminal device changes from a first available parameter range to a second available parameter range, and a parameter within the second available parameter range cannot satisfy a transmission requirement of the data to be transmitted; or determining, by the terminal device, not to perform carrier selection, if the transmission parameter of the terminal device changes from a first available parameter range to a second available parameter range, and a parameter within the second available parameter range can satisfy a transmission requirement of the data to be transmitted.

In a possible implementation manner, the method further includes:

determining, by the terminal device, a parameter range of the transmission parameter of the terminal device according to at least one of a moving speed of the terminal device at present, a synchronization source type of the terminal device at present, a channel busy ratio CBR of the terminal device at present, or a priority of the data to be transmitted of the terminal device at present.

In a possible implementation manner, the determining, by the terminal device, a parameter range of the transmission parameter of the terminal device according to at least one of a moving speed of the terminal device at present, a synchronization source type of the terminal device at present, a channel busy ratio CBR of the terminal device at present, or a priority of the data to be transmitted of the terminal device at present, includes:

determining, by the terminal device, the parameter range of the transmission parameter of the terminal device according to at least one of the moving speed of the terminal device at present, the synchronization source type of the terminal device at present, the CBR of the terminal device at present, or the priority of the data to be transmitted of the terminal device at present, and a second corresponding relationship, where the second corresponding relationship is a corresponding relationship between at least one of a moving speed, a synchronization source type, a channel busy ratio CBR, or a priority of data, and a parameter range of a transmission parameter.

A second aspect provides a terminal device configured to implement the method according to the foregoing first aspect or any possible implementation manners of the first aspect. Specifically, the terminal device includes units configured to execute the method according to the foregoing first aspect or any possible implementation manners of the first aspect.

A third aspect provides a terminal device which includes: a memory, a processor, an input interface and an output interface. Where the memory, the processor, the input interface and the output interface are interconnected via a bus system. The memory is configured to store instructions, the processor is configured to execute the instructions stored in the memory to implement the method according to the foregoing first aspect or any possible implementation manners of the first aspect.

A fourth aspect provides a computer storage medium which is configured to store computer software instructions for implementing the method according to the foregoing first aspect or any possible implementation manners of the first aspect, the instructions includes a program designed to implement the foregoing aspects.

A fifth aspect provides a computer program product including instructions, which when run on a computer, causes the computer to implement the method according to the foregoing first aspect or any possible implementation manners of the first aspect.

BRIEF DESCRIPTION OF DRAWINGS

FIG. 1 is a schematic diagram of an application scenario according to an embodiment of the present disclosure;

FIG. 2 is a schematic flowchart of a method for carrier selection in a vehicle to everything system according to an embodiment of the present disclosure;

FIG. 3 is a schematic diagram of a terminal device according to an embodiment of the present disclosure.

DESCRIPTION OF EMBODIMENTS

Figure 4:
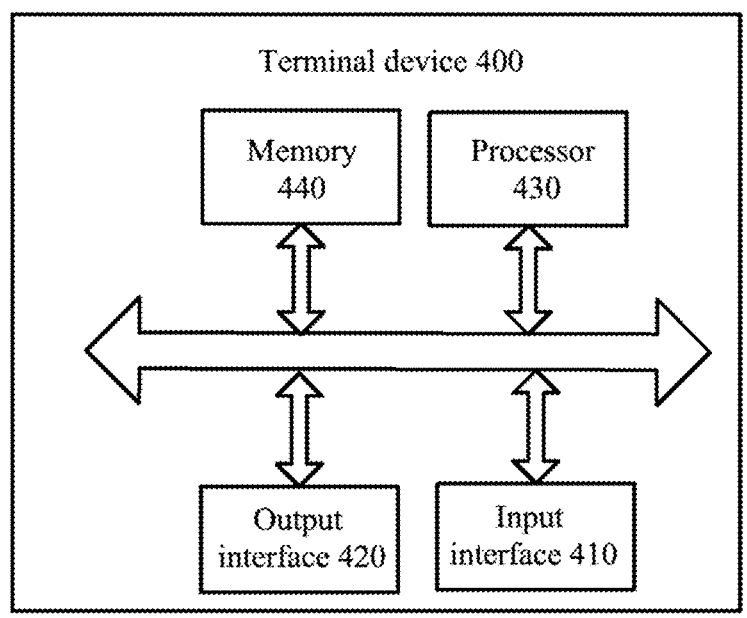
FIG. 4 is a schematic diagram of a terminal device according to another embodiment of the present disclosure.

The technical solutions according to the embodiments of the present disclosure will be hereinafter described with reference to the accompanying drawings in the embodiments of the present disclosure.

It should be understood that, the technical solutions of the embodiments of the present disclosure may be applied to various communication systems, such as an LTE system, an LTE frequency division duplex (FDD) system, an LTE time division duplex (TDD) system, a 4.5th Generation (4.5G) network, a 5th Generation (5G) network, new radio (NR) or the like. The embodiments of the present disclosure may also be applied to a vehicle to everything (V2X) system, for example, a vehicle to vehicle (V2V) system; or, may be also applied to a device to device (D2D) system. The embodiments of the present disclosure are not limited to the above.

It should be understood that, the terminal device in the embodiments of the present disclosure may also be referred to as a terminal, a user equipment (UE), a mobile station (MS), a mobile terminal (MT) etc. The terminal device may be vehicle user equipment (VUE), for example, a vehicle or a wireless terminal in self driving and the like; or, the terminal device may also be a pedestrian user equipment (PUE), such as a mobile phone, a pad, a computer with a wireless transceiver function or the like.

It should be understood that, the network device related in the embodiments of the present disclosure is apparatus which is deployed in a wireless access network to provide a wireless communication function for a terminal device. The network device may be a base station which may include various forms of macro base stations, micro base stations, relay stations, access points or the like. In systems with different wireless access technologies, a device with a base station function may be of different names, for example, in an LTE network, it is called an evolved nodeB (eNB or eNodeB), in an 3rd Generation (3G) network, it is called an Node B or the like.

FIG. 1 is a schematic diagram of an application scenario according to an embodiment of the present disclosure. As shown in FIG. 1, the embodiments of the present disclosure may be applied in various application scenarios, here, a network device and a terminal device in a vehicle to everything system are taken as an example for illustration, where a network device may be a base station 110, a terminal device may be vehicle user equipment, for example, a vehicle 121 and a vehicle 122.

FIG. 2 is a schematic flowchart of a method 200 for carrier selection in a vehicle to everything system according to an embodiment of the present disclosure, the method 200 may be executed by a terminal device in a vehicle to everything system, for example, the vehicle user equipment 121 or the vehicle user equipment 122 as shown in FIG. 1. As shown in FIG. 2, the method 200 includes:

S210, a terminal device determines, according to at least one of information of data to be transmitted, information of the terminal device or information of a carrier for current use, whether to perform carrier selection.

Therefore, in the embodiments of the present disclosure, a terminal device may take at least one of information of the data to be transmitted, the information of the terminal device or the information of the carrier for current use, as reference information for determining whether to trigger the terminal device to perform carrier selection, which is advantageous for satisfying a transmission requirement of the data to be transmitted, additionally, performing carrier selection according to information of the terminal device is advantageous for improving a flexibility of resource configuration.

It should be understood that the data to be transmitted may include data which is newly received and not transmitted yet, or data which is received in a recent time period and not transmitted yet, which is not specifically limited in the embodiments of the present disclosure.

In an implementation, in the embodiments of the present disclosure, the information of the carrier for current use may include information of one carrier, or multiple carriers, which is not limited in the embodiments of the present disclosure.

In an implementation, in the embodiments of the present disclosure, the information of the data to be transmitted may include at least one of the following:

a service type of the data to be transmitted, priority information of the data to be transmitted, reliability requirement information of the data to be transmitted, latency information of the data to be transmitted or information of a terminal version supported by the data to be transmitted.

As an embodiment, the terminal device may determine, according to the service type of the data to be transmitted, whether to trigger the terminal device to perform carrier selection. For example, if the service type of the data to be transmitted is a specific service type, the terminal device may determine to perform carrier selection, otherwise, not to perform carrier selection; or, the terminal device may determine, according to the service type of the data to be transmitted and a service type of a service transmitted (i.e. a service already transmitted before a service to be transmitted), whether to perform carrier selection. For example, if the service type of the data to be transmitted and the service type of the service transmitted are different, the terminal device may determine to perform carrier selection, otherwise, determine not to perform carrier selection etc., the specific condition for triggering the terminal device to perform carrier selection is not limited herein.

As another embodiment, the terminal device may also determine, according to the priority information of the data to be transmitted, whether to perform carrier selection. For example, if a priority of the data to be transmitted is higher than a specific priority, the terminal device may determine to perform carrier selection, otherwise, determine not to perform carrier selection, where the specific priority may be pre-configured, or configured by a network device.

As still another embodiment, the terminal device may also determine, according to the reliability requirement information of the data to be transmitted, whether to perform carrier selection. For example, if a reliability requirement of the data to be transmitted is greater than a specific reliability threshold (for example, 90%), the terminal device may determine to perform carrier selection, where the specific reliability threshold may be pre-configured, or may also be configured by the network device, which is not limited in the embodiments of the present disclosure.

As still another embodiment, the terminal device may also determine, according to the latency information of the data to be transmitted, whether to perform carrier selection. For example, if a latency requirement of the data to be transmitted is smaller than a specific latency threshold (for example, 10 ms), the terminal device may determine to perform carrier selection, where the specific latency threshold may be pre-configured, or may also be configured by the network device, which is not limited in the embodiments of the present disclosure.

As still another embodiment, the terminal device may also determine, according to the information of the terminal version supported by the data to be transmitted, whether to perform carrier selection. For example, if the terminal version supported by the data to be transmitted is a specific version, the terminal device may determine to perform carrier selection, where the specific version may be pre-configured, or configured by the network device.

In an implementation, the terminal device may also combine two pieces or more of the above information to determine whether to perform carrier selection. For example, the terminal device may determine, according to the service type and the priority information of the data to be transmitted, whether to trigger the terminal device to perform carrier selection. For example, when the service type of the data to be transmitted is a specific service type, the terminal device may further combine the priority information of the data to be transmitted to determine whether to perform carrier selection. For example, when a priority of the data to be transmitted is higher than a specific priority, the terminal device may determine to perform carrier selection, otherwise, not to perform carrier selection.

In an implementation, in some embodiments, the terminal device may also determine, according to information of the data to be transmitted and information of the carrier for current use, whether to perform carrier selection.

For example, if a transmission resource on the carrier for current use cannot satisfy a transmission requirement (such as a reliability requirement or a latency requirement etc.) of the data to be transmitted, in such case, the terminal device may determine to perform carrier selection, a step further, the terminal device may select a carrier which can satisfy the transmission requirement of the data to be transmitted as a target carrier to transmit the data; or if the transmission resource on the carrier for current use can satisfy the transmission requirement of the data to be transmitted, then the terminal device may determine not to perform carrier selection.

It should be understood that, the above conditions for triggering the terminal device to perform carrier selection are merely exemplary, a specific condition for triggering the terminal device to perform carrier selection may be adjusted according to information including a specific scenario, a network condition, capacity information of the terminal device or the like, which is not specifically limited herein.

It should also be understood that, in the above, the contents included in the information of the data to be transmitted are merely exemplary, the information of the data to be transmitted may also include other attribution information of the data to be transmitted, such as Quality of Service (QoS) information or the like, which is not limited in the embodiments of the present disclosure.

It should be understood that, in the embodiments of the present disclosure, the carrier selection may be performed by the terminal device in a resource selecting process, or performed separately. For example, when a semi-resource of the terminal device expires (or, be invalidated), the terminal device needs to perform resource selecting, and carrier selection may be performed in a meantime during the resource selecting process.

In the following, with reference to Embodiment 1, it is specified in detail how a terminal device determines, according to the information of the data to be transmitted and the information of the carrier for current use, whether to perform carrier selection.

In Embodiment 1, S210 may specifically include:
determining, by the terminal device, an available carrier for the data to be transmitted according to the information of the data to be transmitted and a first corresponding relationship; and
determining, by the terminal device according to the available carrier for the data to be transmitted and the carrier for current use, whether to perform carrier selection.

In an implementation, in Embodiment 1, the first corresponding relationship is a corresponding relationship between information to be transmitted and available carriers. For example, the first corresponding relationship may be a corresponding relationship between at least one of a service type of the data to be transmitted, priority information of the data to be transmitted, reliability requirement information of the data to be transmitted, latency information of the data to be transmitted or information of a terminal version supported by the data to be transmitted, and an available carrier.

In an implementation, the first corresponding relationship may be a one-to-one correspondence, a one-to-many correspondence, or a many-to-one correspondence, or a many-to-many correspondence. For example, one service type may correspond to one carrier, or one service type may correspond to multiple carriers, or, multiple service types correspond to one carrier, or multiple service types correspond to multiple carriers etc., which is not limited in the embodiments of the present disclosure.

Therefore, the terminal device may determine the carrier which the data to be transmitted may use according to the information of the data to be transmitted combined with the first corresponding relationship, a step further, the terminal device may determine, according to the determined available carrier of the data to be transmitted combined with the carrier for current use, whether to perform carrier selection.

For example, if the carrier for current use and the available carrier which is determined according to the first corresponding relationship are different, in such case, it may be considered that the carrier for current use cannot satisfy the transmission requirement of the data to be transmitted, or it may be considered that the carrier for current use cannot be used to transmit the data to be transmitted, therefore, the terminal device may determine to perform carrier selection. In a possible implementation manner, the terminal device may select one or multiple carriers from the available carrier(s) which is(are) determined according to the first corresponding relationship, as a target carrier(s) for transmitting the data to be transmitted, so as to satisfy the transmission requirement of the data to be transmitted.

Or, if the carrier for current use and the available carrier which is determined according to the first corresponding relationship are the same, in such case, the terminal device may determine not to perform carrier selection, or further determine whether a reserved resource or a granted resource on the carrier for current use can carry the data to be transmitted, or whether the reserved resource or the granted resource on the carrier for current use can satisfy the transmission requirement of the data to be transmitted, and further determine, according to the determination result, whether to perform carrier selection. For example, if the reserved resource or the granted resource on the carrier for current use can carry the data to be transmitted, the terminal device may determine not to perform carrier selection, otherwise, determine to perform carrier selection. A step further, the terminal device may select one or multiple carriers that can carry the data to be transmitted from the available carrier(s) which is(are) determined according to the first corresponding relationship, as a target carrier(s) for transmitting the data to be transmitted.

It is noted that, the carrier for current use and the available carrier(s) which is(are) determined according to the first corresponding relationship being the same may indicate that the carrier for current use and the available carrier(s) are partially or completely the same (denoted as Situation 1). For example, the carrier for current use is Carrier 2, the available carriers which are determined according to the first corresponding relationship are Carrier 1 and Carrier 2, in such case, it may be considered that the carrier for current use and the available carriers are the same.

Correspondingly, the carrier for current use and the available carrier(s) which is(are) determined according to the first corresponding relationship being different, may indicate that the carrier for current use and the available carrier(s) are completely different (denoted as Situation 2). For example, the carrier for current use is Carrier 3, the available carriers which are determined according to the first corresponding relationship are Carrier 1 and Carrier 2, in such case, it may be considered that the carrier for current use and the available carriers are different.

An example to illustrate Embodiment 1, if the carrier for current use is Carrier 1, the first corresponding relationship is a corresponding relationship between service types of data and available carriers, where Service type 1 corresponds to Carrier 1 and Carrier 2, Service type 2 corresponds to Carrier 3 and Carrier 4. If a service type of the data to be transmitted is Service type 1, then the terminal device may determine that the carrier for current use and the available carriers are the same (corresponding to Situation 1). A step further, the terminal device may determine whether a reserved resource or a granted resource on Carrier 1 can carry the data to be transmitted, if the data to be transmitted can be carried, the terminal device may determine not to perform carrier selection, and continue to use a transmission resource on Carrier 1 for data transmission, or if the data to be transmitted cannot be carried, the terminal device may select a resource which can be used to transmit the data to be transmitted on Carrier 1 and/or Carrier 2.

One more example, if the carrier for current use is Carrier 1, the first corresponding relationship is a corresponding relationship between service types of data and available carriers, where Service type 1 corresponds to Carrier 1 and Carrier 2, Service type 2 corresponds to Carrier 3 and Carrier 4. If a service type of the data to be transmitted is Service type 2, then the terminal device may determine that the carrier for current use and the available carriers are different (corresponding to Situation 2), the terminal device may determine to perform carrier selection. A step further, the terminal device may select a resource which can be used to transmit the data to be transmitted on Carrier 3 and/or Carrier 4.

In the following, with reference to Embodiment 2, it is specified in detail how a terminal device determines, according to information of the terminal device, whether to perform carrier selection.

In an implementation, in the embodiments of the present disclosure, the information of the terminal device may include a transmission parameter of the terminal device. In an implementation, the transmission parameter of the terminal device may include at least one of the following: a modulation and coding scheme (MCS), an available physical resource block (PRB), the number of subchannels, the number of retransmissions, a maximum transmission power (maxTxPower), where a subchannel may consist of multiple consecutive PRBs, or may include other attribution information of the terminal device, such as capability information of the terminal device, or a network situation the terminal device is presently in or the like, which is not limited in the embodiments of the present disclosure.

In an implementation, as an embodiment, the terminal device may determine, according to whether the transmission parameter of the terminal device changes, whether to perform carrier selection. For example, the terminal device may determine to perform carrier selection when the transmission parameter of the terminal device changes, otherwise, determine not to perform carrier selection.

In an implementation, as another embodiment, the terminal device may also determine, according to a change amount of the transmission parameter, whether to perform carrier selection. For example, the terminal device may determine to perform carrier selection when the change amount of the transmission parameter of the terminal device is greater than a first threshold, otherwise, determine not to perform carrier selection.

In an implementation, as still another embodiment, the terminal device may also determine, according to whether the changed transmission parameter can satisfy the transmission requirement of the data to be transmitted, whether to perform carrier selection. For example, if the transmission parameter of the terminal device changes from a first available parameter range to a second available parameter range, and a parameter within the second available parameter range cannot satisfy the transmission requirement of the data to be transmitted, in such case, the terminal device determines to perform carrier selection, a step further, a carrier which satisfies the transmission requirement of the data to be transmitted may be selected; or if the transmission parameter of the terminal device changes from the first available parameter range to the second available parameter range, and a parameter within the second available parameter range can satisfy the transmission requirement of the data to be transmitted, the terminal device may determine not to perform carrier selection.

In an implementation, in some embodiments, the method 200 may further include:
  determining, by the terminal device, a parameter range of the transmission parameter of the terminal device according to at least one of a moving speed of the terminal device at present, a synchronization source type of the terminal device at present, a channel busy ratio CBR of the terminal device at present, or a priority of the data to be transmitted of the terminal device at present.

Where, the channel busy ratio (CBR) may be used to indicate a congestion level of a network, the synchronization source type includes but is not limited to a Global Navigation Satellite System (GNSS), an eNB and a UE.

In an implementation, in some embodiments, at least one of a moving speed of the terminal device at present, a synchronization source type of the terminal device at present, a channel busy ratio CBR of the terminal device at present, or a priority of the data to be transmitted of the terminal device at present, and a parameter range of a transmission parameter may have a second corresponding relationship, where the second relationship may be pre-configured by a network device, or may be pre-configured on the terminal device.

In an implementation, the second corresponding relationship may be a one-to-one correspondence, a one-to-many correspondence, or a many-to-one correspondence, or a many-to-many correspondence. For example, one synchronization source type may correspond to one group of transmission parameters, or multiple synchronization source types may correspond to one group of transmission parameters, or one speed range and one synchronization source type correspond to one group of transmission parameters etc., which is not limited in the embodiments of the present disclosure.

As an example rather than limitation, the second corresponding relationship may be shown in table 1:

TABLE 1

| | | | ≤120 km/h | >120 km/h |
|---|---|---|---|---|
| Speed range | | | | |
| Synchronization source types | GNSS | MCS | [0, 28] | [0, 10] |
| | | PRB number | [1, 50] | [1, 16] |
| | | The number of retransmissions | {0, 1} | 1 |
| | | Maximum transmission power | 23 dBm (decibel milliwatt) | 23 dBm |
| | eNB | MCS | [0, 21] | [0, 6] |
| | | PRB number | [1, 30] | [1, 8] |
| | | The number of retransmissions | {0, 1} | 1 |
| | | Maximum transmission power | 23 dBm | 23 dBm |
| | UE | MCS | [0, 9] | [0, 4] |
| | | PRB number | [1, 10] | [1, 4] |
| | | The number of retransmissions | {0, 1} | 1 |
| | | Maximum transmission power | 23 dBm | 23 dBm |

For example, if the present synchronization source type is GNSS, when a speed of the terminal device changes from being smaller than 120 km/h to being greater than 120 km/h, the terminal device may determine, according to the corresponding relationship as shown in table 1, an available PRB number range changes from [1,50] to [1,16]. If an PRB number required for the data to be transmitted is greater than 16, in such case, the terminal device may determine that the changed available parameter range cannot satisfy a transmission requirement of the data to be transmitted, thus the terminal device may be triggered to perform carrier selection, or, the terminal device may be triggered to perform resource selection, specifically, carrier selection may be performed during a resource selecting process.

In an implementation, in some embodiments, the data to be transmitted may be first data newly received, therefore, the terminal device may also determine, according to a service type and/or attribution information of the first data, whether to perform carrier selection.

In the following, with reference to Embodiment 3 to Embodiment 7, a method for carrier selection according to another embodiment is specified in detail.

Embodiment 3: performing carrier selection according to a service type of first data.

In an exemplary embodiment of Embodiment 3, the terminal device may determine, according to the service type of the first data and a service type of second data, whether to perform carrier selection, where a received time of the second data is earlier than a received time of the first data.

Namely, the terminal device may determine, according to a service type of a service newly received (i.e. the first data) and a service type of an existing service (i.e. the second data), whether to perform carrier selection. Where the second data may refer to service data received before the first data and not yet transmitted.

In an implementation, as an embodiment, the terminal device may determine to perform carrier selection when the service type of the first data and the service type of the second data are different. Or, when the service type of the first data and the service type of the second data are different, the terminal device may further combine attribution information of the first data, for example, priority information, latency information or the like, to determine whether to perform carrier selection, reference may be made to the related description in Embodiment 4 to Embodiment 7 for the specific implementation thereof.

In an implementation, as another embodiment, if the service type of the first data and the service type of the second data are the same, the terminal device may determine not to perform carrier selection, or the terminal device may further combine the attribution information of the first data (for example, the priority information, the latency information or the like), to determine whether to perform carrier selection, reference may be made to the related description in Embodiment 4 to Embodiment 7 for the specific implementation thereof.

In an implementation, as still another embodiment, the terminal device may determine to perform carrier selection when the service type of the first data newly received is a specific service type, where the specific service type may be pre-configured, or may be configured by a network device.

In an implementation, as still another embodiment, the terminal device may determine, according to the service type of the first data and a transmitting capacity of the terminal device, whether to perform carrier selection. For example, if the transmitting capacity of the terminal device is not restrained, the terminal device may determine to perform carrier selection when the first data is received. Or, if the transmitting capacity of the terminal device is restrained, the terminal device may determine not to perform carrier selection, or may further combine attribution information of the first data to determine whether to perform carrier selection. For example, if a priority of the first data is higher than a priority of the second data, then the terminal device may determine to perform carrier selection for the first data preferentially, that is, to select a transmission resource for the first data preferentially; or, if the priority of the first data is lower than the priority of the second data, then the terminal device may determine not to perform carrier selection.

When the terminal device determines to perform carrier selection for the first data, a step further, the terminal device may determine for the first data, according to the service type of the first data and the foregoing first corresponding relationship, a target carrier selected.

For example, if the service type of the first data is a cooperate awareness message (CAM), the service type of the second data is a decentralized environmental notification message (DENM). On receiving the first data, the terminal device may determine the service type of the first data and that of the second data are different, then trigger the terminal device to perform carrier selection.

Situation 1: the service type of the first data and the service type of the second data correspond to different carriers, for example, in the first corresponding relationship, CAM corresponds to Carrier 1 and Carrier 2, DENM corresponds to Carrier 3 and Carrier 4, then the terminal device may select a transmission resource for the first data on Carrier 3 or Carrier 4.

Situation 2: the service type of the first data and the service type of the second data correspond to the same carrier, for example, in the first corresponding relationship, CAM corresponds to Carrier 1 and Carrier 2, DENM also corresponds to Carrier 1 and Carrier 2, if the transmission resource presently used by the terminal device is on Carrier 2, then the terminal device may select a transmission resource for the first data on Carrier 1 or Carrier 2.

Embodiment 4: the attribution information of the first data is the priority information, the terminal device performs carrier selection according to the priority information of the first data.

For example, when a priority of the first data is higher than a specific priority, the terminal device may determine to perform carrier selection, where, the specific priority may be pre-configured, or may be configured by a network device.

In an implementation, as an embodiment, the terminal device may determine, according to the priority information of the first data and priority information of second data, whether to perform carrier selection, where a received time of the second data is earlier than a received time of the first data.

It should be understood that, in Embodiment 4, a service type of the first data and the second data may be the same, or different, which is not limited in the embodiment of the present disclosure.

Situation 1: if the service type of the first data and the second data are the same, then priorities of the first data and the second data may be determined according to a ProSe Per-Packet Priority (PPPP) of an adjacent service. For example, if the first data and the second data are both CAM, the PPPP of the first data is 1, the PPPP of the second data is 4, then it may be determined that the priority of the first data is higher than the priority of the second data.

Situation 2: if the service type of the first data and the second data are different, the priorities of the first data and the second data may be determined according to the corresponding PPPPs. For example, if PPPP=4 for the service type CAM is considered as being equal to PPPP=4 for DENM, then if the service type of the first data is CAM, PPPP=3, the service type of the second data is DENM, PPPP=3, then it may be determined that the priority of the second data is higher than the priority of the first data.

In a specific embodiment of Embodiment 4, the determining, by the terminal device, according to the priority information of the first data and the priority information of the second data, whether to perform carrier selection includes:

determining, by the terminal device, to perform carrier selection if the priority of the first data is higher than the priority of the second data.

Specifically, if the priority of the first data is higher than the priority of the second data, the terminal device may determine to perform carrier selection for the first data preferentially. In a possible implementation manner, the terminal device may determine for the first data, according to the priority of the first data and the foregoing first corresponding relationship, a target carrier selected.

In an implementation, in the embodiments of the present disclosure, if the priority of the first data is lower than the priority of the second data, the terminal device may determine not to perform carrier selection, or, in such case, the terminal device may further combine a transmitting capacity of the terminal device or other attribution information, to determine whether to perform carrier selection. For example, if the transmitting capacity of the terminal device is not restrained, the terminal device may determine to perform carrier selection, the terminal device selects a carrier for transmitting the first data from the available carrier(s) corresponding to the priority of the first data, without changing a carrier for transmitting the second data, reference may be made to the related description in the foregoing embodiments for the specific implementation of the carrier selection, or, if the transmitting capacity of the terminal device is restrained, the terminal device may determine not to perform carrier selection.

Embodiment 5: the attribution information of the first data is reliability requirement information, the terminal device determines, according to the reliability requirement information of the first data, whether to perform carrier selection.

In an implementation, the terminal device may determine to perform carrier selection when a reliability requirement of the first data is greater than a specific reliability threshold (for example, 90%), where the specific reliability threshold may be pre-configured, or may be configured by a network device, which is not limited in the embodiment of the present disclosure.

In an implementation, as an embodiment, the terminal device may determine, according to the reliability requirement information of the first data and reliability requirement information of the second data, whether to perform carrier selection, where a received time of the second data is earlier than a received time of the first data.

For example, if the reliability requirement of the first data (for example, 90%) is higher than a reliability requirement of the second data (for example, 80%), the terminal device determines to perform carrier selection. Or if the reliability requirement of the first data is lower than the reliability requirement of the second data, the terminal device may determine not to perform carrier selection, or, in such case, the terminal device may further combine a transmitting capacity of the terminal device or other attribution information, to determine whether to perform carrier selection. For example, if the transmitting capacity of the terminal device is not restrained, the terminal device may determine to perform carrier selection, reference may be made to the related description in the foregoing embodiments for the specific implementation of the carrier selection, or, if the transmitting capacity of the terminal device is restrained, the terminal device may determine not to perform carrier selection.

When the terminal device determines to perform carrier selection, the terminal device may determine to perform carrier selection for the first data preferentially. In a possible implementation manner, the terminal device may determine for the first data, according to the reliability requirement of the first data and the foregoing first corresponding relationship, a target carrier selected.

Embodiment 6: the attribution information of the first data is latency information, the terminal device determines whether to perform carrier selection according to the latency information of the first data.

In an implementation, the terminal device may determine to perform carrier selection when a latency requirement of the first data is smaller than a specific latency threshold (for example, 10 ms), where the specific latency threshold may be pre-configured, or may be configured by a network device, which is not limited in the embodiment of the present disclosure.

In an implementation, as an embodiment, the terminal device may determine, according to the latency information of the first data and latency information of second data, whether to perform carrier selection, where a received time of the second data is earlier than a received time of the first data.

For example, if the latency requirement of the first data (for example, 5 ms) is smaller than a latency requirement of the second data (for example, 10 ms), the terminal device determines to perform carrier selection. Or if the latency requirement of the first data is greater than the latency requirement of the second data, the terminal device may determine not to perform carrier selection, or, in such case, the terminal device may further combine a transmitting capacity of the terminal device or other attribution information, to determine whether to perform carrier selection. For example, if the transmitting capacity of the terminal device is not restrained, the terminal device may determine to perform carrier selection, reference may be made to the related description in the foregoing embodiments for the specific implementation of the carrier selection, or, if the transmitting capacity of the terminal device is restrained, the terminal device may determine not to perform carrier selection.

When the terminal device determines to perform carrier selection, the terminal device may determine to perform carrier selection for the first data preferentially. In a possible implementation manner, the terminal device may determine for the first data, according to the latency requirement of the first data and the foregoing first corresponding relationship, a target carrier selected.

Embodiment 7: the attribution information of the first data is information of a terminal version supported by the first data, the terminal device performs carrier selection according to the information of the terminal version supported by the first data.

For example, the terminal device may determine to perform carrier selection when a terminal supported by the first data is of a specific version, where the specific version may be pre-configured, or may be configured by a network device.

In an implementation, as an embodiment, the terminal device may determine, according to the information of the terminal version supported by the first data and information of the terminal version supported by second data, whether to perform carrier selection, where a received time of the second data is earlier than a received time of the first data.

For example, if a terminal version supported by the first data is lower than a terminal version supported by the second data, the terminal device determines to perform carrier selection.

Specifically, when the terminal version supported by the first data is lower than the terminal version supported by the second data, the terminal device may determine to perform carrier selection for the first data preferentially. In a possible implementation manner, the terminal device may determine for the first data, according to the information of the terminal version supported by the first data and the foregoing first corresponding relationship, a target carrier selected.

In an implementation, in the embodiment, if the terminal version supported by the first data is lower than the terminal version supported by the second data, the terminal device may determine not to perform carrier selection, or, in such case, the terminal device may further combine a transmitting capacity of the terminal device or other attribution information, to determine whether to perform carrier selection. For example, if the transmitting capacity of the terminal device is not restrained, the terminal device may determine to perform carrier selection, reference may be made to the related description in the foregoing embodiments for the specific implementation of the carrier selection, or, if the transmitting capacity of the terminal device is restrained, the terminal device may determine not to perform carrier selection.

In the above, with reference to Embodiment 3 to Embodiment 7, it is specified in detail how it is determined, according to the service type and/or the attribution information of the first data, whether to perform carrier selection. It should be understood that, the above Embodiment 3 to Embodiment 7 may be used separately or in combination, which is not limited in the embodiments of the present disclosure.

The method embodiments of the present disclosure are specified in detail in the above with reference to FIG. 2, and the device embodiments of the present disclosure will be specified in detail in the following with reference to FIG. 3 and FIG. 4.

FIG. 3 is a schematic diagram of a terminal device 300 according to an embodiment of the present disclosure. As shown in FIG. 3, the terminal device 300 includes:

a determining module 310, configured to determine, according to at least one of information of data to be transmitted, information of the terminal device or information of a carrier for current use, whether to perform carrier selection.

In an implementation, in some embodiments, the determining module 310 is specifically configured to:

determine an available carrier for the data to be transmitted according to the information of the data to be transmitted and a first corresponding relationship; and determine, according to the available carrier for the data to be transmitted and the carrier for current use, whether to perform carrier selection.

In an implementation, in some embodiments, the determining module 310 is specifically configured to:

determine to perform carrier selection, if the available carrier for the data to be transmitted and the carrier for current use are different.

In an implementation, in some embodiments, the determining module 310 is further configured to:

determine to perform carrier selection, if the available carrier for the data to be transmitted and the carrier for current use are the same, and a reserved resource or a granted resource on the carrier for current use cannot carry the data to be transmitted.

In an implementation, in some embodiments, the first corresponding relationship is a corresponding relationship between at least one of a service type of the data to be transmitted, priority information of the data to be transmitted, reliability requirement information of the data to be transmitted, latency information of the data to be transmitted or information of a terminal version supported by the data to be transmitted, and an available carrier.

In an implementation, in some embodiments, the information of the data to be transmitted includes at least one of the following:

a service type of the data to be transmitted, priority information of the data to be transmitted, reliability requirement information of the data to be transmitted, latency information of the data to be transmitted or information of a terminal version supported by the data to be transmitted.

In an implementation, in some embodiments, the information of the terminal device includes a transmission parameter of the terminal device, the determining module 310 is further configured to:

determine whether to perform carrier selection according to the transmission parameter of the terminal device.

In an implementation, in some embodiments, the determining module 310 is specifically configured to:

determine to perform carrier selection, if the transmission parameter of the terminal device changes from a first available parameter range to a second available parameter range, and a parameter within the second available parameter range cannot satisfy a transmission requirement of the data to be transmitted; or determine not to perform carrier selection, if the transmission parameter of the terminal device changes from a first available parameter range to a second available parameter range, and a parameter within the second available parameter range can satisfy a transmission requirement of the data to be transmitted.

In an implementation, in some embodiments, the determining module 310 is further configured to:

determine a parameter range of the transmission parameter of the terminal device according to at least one of a moving speed of the terminal device at present, a synchronization source type of the terminal device at present, a channel busy ratio CBR of the terminal device at present, or a priority of the data to be transmitted of the terminal device at present.

In an implementation, in some embodiments, the determining module 310 is specifically configured to:

determine the parameter range of the transmission parameter of the terminal device, according to at least one of the moving speed of the terminal device at present, the synchronization source type of the terminal device at present, the CBR of the terminal device at present, or the priority of the data to be transmitted of the terminal device at present, and a second corresponding relationship, wherein the second corresponding relationship is a corresponding relationship between at least one of a moving speed, a synchronization source type, a channel busy ratio CBR, or a priority of data, and a parameter range of a transmission parameter.

It should be understood that, the terminal device 300 according to the embodiments of the present disclosure may correspond to the terminal device in the method embodiments of the present disclosure, and the foregoing and other operations and/or functions of the various units of the terminal device 300 are respectively designed to implement the corresponding procedure of the terminal device according to the method 200 as shown in FIG. 2, which will not be repeated here for conciseness.

As shown in FIG. 4, a terminal device 400 is provided in the embodiment of the present disclosure, the terminal device 400 may be the terminal device 300 as shown in FIG. 3, which can be configured to perform the content corresponding to the terminal device in the method 200 as shown in FIG. 2. The terminal device 400 includes: an input interface 410, an output interface 420, a processor 430 and a memory 440, the input interface 410, the output interface 420, the processor 430 and the memory 440 may be interconnected via a bus system. The memory 440 is configured to store programs, instructions or codes. The processor 430 is configured to execute the programs, instructions or codes stored in the memory 440, to control the input interface 410 to receive signals and control the output interface 420 to transmit signals, so as to implement operations according to the foregoing method embodiments.

It should be understood, in the embodiments of the present disclosure, the processor 430 may be a central processing unit (CPU), and the processor 430 may also be a general-purpose processor or a digital signal processor (DSP), an application-specific integrated circuit (ASIC), a ready-made programmable gate array (FPGA) or other programmable logic device, a discrete gate or transistor logic device, a discrete hardware component or the like. The general-purpose processor may be a microprocessor or the processor may also be any conventional processors or the like.

The memory 440 may include a read-only memory and a random access memory, and provides instructions and data to the processor 430. A part of the memory 440 may also include a non-volatile random access memory. For example, the memory 440 may also store information of a device type.

In the process of implementing, the content in the foregoing method may be implemented by a hardware integrated logic circuit in the processor 430 or instructions in the form of software. The contents of the method disclosed in the embodiments of the present disclosure in combination, may be directly embodied as being executed by a hardware processor, or executed by a combination of hardware and software modules in the processor. The software modules can be located in a storage medium which is mature in the present field such as a random access memory, a flash memory, a read-only memory, a programmable read-only memory, an electrically erasable programmable memory or a register. The storage medium is located in the memory 440, and the processor 430 reads information in the memory 440 to implement, in combination with its hardware, the content of the foregoing method, which will not be described in detail herein for the sake of brevity.

In a specific implementation, the determining module 310 included in the terminal device 300 as shown in FIG. 3 may be implemented by the processor 430 in FIG. 4.

An embodiment of the present disclosure also proposes a computer readable storage medium which is configured to store one or multiple programs including instructions, which when being executed by a portable electronic device including multiple applications, cause the portable electronic device to implement the method according to the embodiment as shown in FIG. 2.

An embodiment of the present disclosure also proposes a computer program including instructions, which when run on a computer, causes the computer to implement the corresponding procedure of the method according to the embodiment as shown in FIG. 2.

A person ordinary skilled in the art may realize, the various exemplary units and algorithm steps disclosed herein in combination, can be implemented by an electronic hardware, or a combination of computer software and an electronic hardware. Whether these functions are implemented by a hardware or a software depends on a specific application and a design constraint condition of the technical solution. Professional and technical personnel can use different methods to implement the functions described with respect to each specific application, however, such implementation should not be considered as going beyond the scope of the present disclosure.

A person skilled in the art can clearly understand that, for the convenience and conciseness of description, reference may be made to the corresponding process in the foregoing method embodiments for the specific working process of the system, device and unit described above, which will not be repeated herein again.

In the several embodiments provided in the present disclosure, it should be understood that the disclosed system, device, and method can be implemented in other manners. For example, the device embodiments described above are merely illustrative. For example, the dividing of the units is only a logical function division, and there may be other division manners in a practical implementation. For example, multiple units or components may be combined with or integrated into another system, or some features may be omitted or not executed. In addition, the mutual coupling or direct coupling or communication connection shown or discussed may be an indirect coupling or a communication connection through some interfaces, devices or units, which may be electrical, mechanical or otherwise.

The units described as discrete components may or may not be physically separated, a component shown as a unit may or may not be a physical unit, namely, it may be located in one place, or may be distributed in multiple network elements. Some or all of the units may be selected according to practical needs to achieve the purpose of the solution of the embodiments.

In addition, the various function units in each embodiment of the present disclosure may be integrated in one processing unit, or each unit may physically exist alone, or two or more units may be integrated in one unit.

The functions may be stored in a computer readable storage medium if being implemented in the form of a software function unit and sold or used as a stand-alone product. Based on such understanding, the technical solutions of the present disclosure, substantively, or a part of which that makes a contribution to the prior art, or a part of which, may be embodied in the form of a software product, the computer software product is stored in a storage medium and includes several instructions to cause a computer (which may be a personal computer, a server, a network device or the like) to execute all or part of the steps of the methods described in the various embodiments of the present disclosure. The foregoing storage medium includes: a USB flash disk, a mobile hard disk drive, a read-only memory (ROM), a random access memory (RAM), a magnetic disk or an optical disk, or other medium that can store program codes.

The foregoing description is simply specific embodiments of the present disclosure, however, the protection scope of the present disclosure is not limited thereto. Any alteration or substitution that a person skilled in the art may easily acquire within the technical scope disclosed by the present disclosure, shall all be encompassed in the protection scope of the present disclosure. Therefore, the protection scope of the present disclosure shall be subject to the protection scope of the claims.

What is claimed is:

1. A method for carrier selection, comprising:
   acquiring, by a terminal device, information of data to be transmitted;
   acquiring, by the terminal device, information of a carrier configured for use;
   determining, by the terminal device, an available carrier for the data to be transmitted according to the information of the data to be transmitted and a first corresponding relationship, wherein the first corresponding relationship is a corresponding relationship between information of data to be transmitted and the available carrier; and
   triggering, by the terminal device, carrier selection at least based on the available carrier for the data to be transmitted and the carrier configured for use;
   wherein the triggering, by the terminal device, carrier selection at least based on the available carrier for the data to be transmitted and the carrier configured for use, comprises:
   triggering, by the terminal device, carrier selection, if the available carrier for the data to be transmitted and the carrier configured for use are different.

2. The method according to claim 1, wherein the triggering, by the terminal device, carrier selection at least based on the available carrier for the data to be transmitted and the carrier configured for use, further comprises:
   triggering, by the terminal device, carrier selection, if the available carrier for the data to be transmitted and the carrier configured for use are the same, and no reserved resource or granted resource on the carrier configured for use is allowed to carry the data to be transmitted.

3. The method according to claim 1, wherein the triggering, by the terminal device, carrier selection at least based on the available carrier for the data to be transmitted and the carrier configured for use, comprises:
   triggering, by the terminal device, carrier selection based on the available carrier for the data to be transmitted, the carrier configured for use and a transmission parameter of the terminal device.

4. The method according to claim 3, wherein the triggering, by the terminal device, carrier selection based on the available carrier for the data to be transmitted, the carrier configured for use and a transmission parameter of the terminal device, comprises:
   triggering, by the terminal device, carrier selection, if the transmission parameter of the terminal device is within a parameter range which cannot satisfy a transmission requirement of the data to be transmitted.

5. The method according to claim 4, further comprising:
   determining, by the terminal device, a parameter range of the transmission parameter of the terminal device according to at least one of a moving speed of the terminal device, a synchronization source type of the terminal device, a channel busy ratio (CBR) of the terminal device, or a priority of data to be transmitted of the terminal device.

6. The method according to claim 5, wherein the determining, by the terminal device, a parameter range of the transmission parameter of the terminal device according to at least one of a moving speed of the terminal device, a synchronization source type of the terminal device, a channel busy ratio (CBR) of the terminal device, or a priority of the data to be transmitted of the terminal device, comprises:
   determining, by the terminal device, the parameter range of the transmission parameter of the terminal device according to at least one of the moving speed of the terminal device at present, the synchronization source type of the terminal device at present, the CBR of the terminal device at present, or the priority of the data to be transmitted of the terminal device at present, and a second corresponding relationship, wherein the second corresponding relationship is a corresponding relationship between at least one of a moving speed, a synchronization source type, a CBR, or a priority of data, and a parameter range of a transmission parameter.

7. The method according to claim 1, wherein the information of the data to be transmitted comprises at least one of the following:
   a service type of the data to be transmitted, priority information of the data to be transmitted, reliability requirement information of the data to be transmitted, latency information of the data to be transmitted or information of a terminal version supported by the data to be transmitted.

8. The method according to claim 1, wherein the first corresponding relationship is a corresponding relationship between an available carrier and at least one of: a service type of the data to be transmitted, priority information of the data to be transmitted, reliability requirement information of the data to be transmitted, latency information of the data to be transmitted or information of a terminal version supported by the data to be transmitted.

9. A non-transitory computer-readable storage medium, storing thereon computer executable instructions which, when being executed by a processor, implement the method for carrier selection according to claim 1.

10. A terminal device, comprising:
a memory, a processor, an input interface and an output interface, wherein the memory, the processor, the input interface and the output interface are interconnected via a bus system, the memory is configured to store instructions, the processor is configured to:
acquire information of data to be transmitted;
acquire information of a carrier configured for use;
determine an available carrier for the data to be transmitted according to the information of the data to be transmitted and a first corresponding relationship, wherein the first corresponding relationship is a corresponding relationship between information of data to be transmitted and the available carrier; and
trigger carrier selection at least based on the available carrier for the data to be transmitted and the carrier configured for use;
wherein the processor is configured to:
trigger carrier selection, if the available carrier for the data to be transmitted and the carrier configured for use are different.

11. The terminal device according to claim 10, wherein the processor is further configured to:
trigger carrier selection, if the available carrier for the data to be transmitted and the carrier configured for use are the same, and no reserved resource or granted resource on the carrier configured for use is allowed to carry the data to be transmitted.

12. The terminal device according to claim 10, wherein the processor is configured to:
trigger carrier selection based on the available carrier for the data to be transmitted, the carrier configured for use and a transmission parameter of the terminal device.

13. The terminal device according to claim 12, wherein the processor is configured to:
trigger carrier selection, if the transmission parameter of the terminal device is within a parameter range which cannot satisfy a transmission requirement of the data to be transmitted.

14. The terminal device according to claim 13, wherein the processor is further configured to:
determine a parameter range of the transmission parameter of the terminal device according to at least one of a moving speed of the terminal device, a synchronization source type of the terminal device, a channel busy ratio (CBR) of the terminal device, or a priority of data to be transmitted of the terminal device.

15. The terminal device according to claim 14, wherein the processor is configured to:
determine the parameter range of the transmission parameter of the terminal device according to at least one of the moving speed of the terminal device at present, the synchronization source type of the terminal device at present, the CBR of the terminal device at present, or the priority of the data to be transmitted of the terminal device at present, and a second corresponding relationship, wherein the second corresponding relationship is a corresponding relationship between at least one of a moving speed, a synchronization source type, a CBR, or a priority of data, and a parameter range of a transmission parameter.

16. The terminal device according to claim 10, wherein the information of the data to be transmitted comprises at least one of the following:
a service type of the data to be transmitted, priority information of the data to be transmitted, reliability requirement information of the data to be transmitted, latency information of the data to be transmitted or information of a terminal version supported by the data to be transmitted.

17. The terminal device according to claim 10, wherein the first corresponding relationship is a corresponding relationship between an available carrier and at least one of: a service type of the data to be transmitted, priority information of the data to be transmitted, reliability requirement information of the data to be transmitted, latency information of the data to be transmitted or information of a terminal version supported by the data to be transmitted.

* * * * *